US009494192B2

(12) United States Patent
Chabert

(10) Patent No.: US 9,494,192 B2
(45) Date of Patent: Nov. 15, 2016

(54) HOOP FOR A HYDROSTATIC OR HYDRODYNAMIC BEARING, METHOD FOR MOUNTING SUCH A HOOP ON A SHAFT, AND ASSEMBLY FORMED BY SUCH A HOOP AND A SHAFT

(71) Applicant: ALSTOM Renewable Technologies, Grenoble (FR)

(72) Inventor: Lucas Chabert, Seyssinet-Pariset (FR)

(73) Assignee: ALSTOM Renewable Technologies, Grenoble (FR)

( * ) Notice: Subject to any disclaimer, the term of this patent is extended or adjusted under 35 U.S.C. 154(b) by 71 days.

(21) Appl. No.: 14/510,732

(22) Filed: Oct. 9, 2014

(65) Prior Publication Data

US 2015/0023620 A1    Jan. 22, 2015

Related U.S. Application Data

(63) Continuation of application No. PCT/EP2013/057663, filed on Apr. 12, 2013.

(30) Foreign Application Priority Data

Apr. 13, 2012    (FR) ...................................... 12 53442

(51) Int. Cl.
*F16C 32/06* (2006.01)
*F16C 35/02* (2006.01)
(Continued)

(52) U.S. Cl.
CPC .............. *F16C 32/06* (2013.01); *B23P 15/003* (2013.01); *F03B 11/06* (2013.01); *F04D 29/057* (2013.01);
(Continued)

(58) Field of Classification Search
CPC ...... F16C 17/02; F16C 17/022; F16C 17/14; F16C 32/06; F16C 32/064; F16C 32/0651; F16C 32/0662; F16C 32/0685; F16C 32/0629; F16C 33/043; F16C 33/046; F16C 35/02; F16C 43/02; F03B 11/06; F04D 29/0566; F04D 29/057; B23P 15/003
USPC ....... 384/100, 114, 119, 125, 212, 273, 276, 384/280
See application file for complete search history.

(56) References Cited

U.S. PATENT DOCUMENTS 2,380,715 A    7/1945  Aker
3,904,257 A *  9/1975  Herbert ................. F16C 17/022
                                                    384/286

(Continued)

FOREIGN PATENT DOCUMENTS

FR    2 341 067    9/1977
FR    2 768 661    3/1999
(Continued)

OTHER PUBLICATIONS

Translation of JP 0783231 obtained May 11, 2015.*

*Primary Examiner* — James Pilkington
(74) *Attorney, Agent, or Firm* — Dority & Manning, P.A.

(57) ABSTRACT

A hoop including a cylinder which, so that the hoop can be mounted around a shaft, is formed by multiple parts that are assembled together using steps that can produce an assembly without deformation of an external surface of the cylinder. A ring, of which an external surface forms the internal surface of a bearing and which, so that it can be secured to the external wall of the cylinder, is formed by multiple elements that are secured to the cylinder by securing devices that can maintain a machining tolerance of the external surface of the ring.

14 Claims, 5 Drawing Sheets

(51) Int. Cl.
    *F03B 11/06*     (2006.01)
    *F16C 43/02*     (2006.01)
    *F04D 29/056*     (2006.01)
    *F04D 29/057*     (2006.01)
    *F16C 17/02*     (2006.01)
    *F16C 17/14*     (2006.01)
    *F16C 33/04*     (2006.01)
    *B23P 15/00*     (2006.01)

(52) U.S. Cl.
    CPC ........... *F04D 29/0566* (2013.01); *F16C 17/02* (2013.01); *F16C 17/022* (2013.01); *F16C 17/14* (2013.01); *F16C 32/0629* (2013.01); *F16C 33/043* (2013.01); *F16C 33/046* (2013.01); *F16C 35/02* (2013.01); *F16C 43/02* (2013.01); *Y02E 10/226* (2013.01); *Y10T 29/49639* (2015.01)

(56) References Cited

U.S. PATENT DOCUMENTS

| | | | | |
|---|---|---|---|---|
| 4,097,094 A | * | 6/1978 | Gardner | F16C 17/02 384/215 |
| 4,149,761 A | | 4/1979 | Telle | |
| 4,892,419 A | | 1/1990 | Inoue et al. | |
| 5,219,231 A | * | 6/1993 | Sheedy | F16C 35/02 384/192 |
| 5,689,146 A | * | 11/1997 | Cheever | F16C 17/10 384/110 |
| 5,839,880 A | | 11/1998 | Okada et al. | |
| 2010/0166578 A1 | | 7/2010 | Watson | |

FOREIGN PATENT DOCUMENTS

FR     2 938 616     5/2010
JP     07083231     3/1995

* cited by examiner

HOOP FOR A HYDROSTATIC OR HYDRODYNAMIC BEARING, METHOD FOR MOUNTING SUCH A HOOP ON A SHAFT, AND ASSEMBLY FORMED BY SUCH A HOOP AND A SHAFT

CROSS-REFERENCE TO RELATED APPLICATIONS

This application claims priority to PCT/EP2013/057663 filed Apr. 12, 2013, which claims priority to FR Application 1253442 filed Apr. 13, 2012 both of which are hereby incorporated in their entireties.

TECHNICAL FIELD

The invention relates to a hoop intended to be mounted on the shaft of a turning machine to form an inner surface of a hydrostatic or hydrodynamic bearing.

BACKGROUND

The advantages of water bearings in relation to oil bearings are known, in particular in terms of pollution. In fact the function and maintenance of an oil bearing inevitably causes some of the oil used to be released into the environment.

However production of a water bearing is particularly difficult. The radial play between the inner and outer surfaces of the bearing is reduced to the order of 0.1 mm, which in particular requires the inner surface of the bearing to be machined with a tolerance of less than or equal to 5 hundredths or a millimeter, preferably 3 hundredths of a millimeter. The best tools currently available allow such machining precision.

There is also a need to overhaul existing machines by replacing their oil bearings with water bearings.

Currently this overhaul consists of grinding the surface of the shaft forming the inner surface of the bearing, to change from the tolerance required for an oil bearing (typically 50 hundredths of a millimeter) to that required for a water bearing (typically 5 hundredths of a millimeters). For this the shaft must be removed from the machine to transport it from the operating site of the machine to a workshop for grinding the surface with a suitable tool. Then once ground, the shaft is transported from the factory to the operating site before being refitted, whereupon the machine can resume its operation.

As well as the risks linked to transport of the shaft and problems linked to a fitting and refitting the shaft, the time during which the machine is not in operation is particularly long (of the order of several months). This represents a high cost for the operator which often prevents him from proceeding with such an overhaul.

To reduce the lost operating time, document FR-A-2938616 proposes a hoop intended for mounting on the shaft, preferably in situ, the outer radial surface of the hoop constituting the inner surface of the bearing.

However mechanical constraints resulting from clamping of such a hoop have the effect of deforming the geometry of the outer surface of the hoop, such that the machining tolerance of the outer surface of the hoop obtained in the workshop is lost. Furthermore since the shaft surface is machined to the tolerance required for an oil bearing, after clamping of the hoop on the shaft surface, the tolerance of the outer surface of the mounted hoop corresponds to the tolerance of the shaft surface i.e. 50 hundredths of the millimeter.

SUMMARY

The aim of the invention is therefore to solve this problem by proposing in particular a hoop and a method for mounting this hoop which retains the machining tolerance of the outer surface of the hoop.

For this the object of the invention is a hoop intended to be mounted on a shaft of a turning machine to form an inner surface of a hydrostatic or hydrodynamic bearing, characterized in that it comprises:

- a cylinder which, in order to be able to be mounted around the shaft, is composed of multiple parts that are joined together by assembly means able to produce an assembly without deformation of an outer surface of the cylinder;
- a ring, an outer surface of which constitutes the inner surface of the bearing and which, in order to be able to be fixed to the outer wall of the cylinder, is composed of multiple elements fixed to the cylinder by fixing means able to retain a machining tolerance of said outer surface of the ring.

According to advantageous but non-obligatory aspects of the invention, a hoop as mentioned above may incorporate one or more of the following characteristics, taken in all technically possible combinations:

- the cylinder is fitted with adjustment means, preferably consisting of a plurality of button-head screws which are arranged radially and can come to rest on the shaft, to allow balancing of the assembly formed by the shaft and cylinder while maintaining a space between the shaft and the cylinder;
- the cylinder is composed of a first part and a second part, each part being semi-circular;
- an outer surface of the cylinder comprises an annular collar extending radially towards the outside, and the ring comprises an annular groove constituting a housing adapted to the collar, for receiving this during fixing of the ring to the cylinder;
- the collar comprises a plurality of axial through channels and the ring comprises a plurality of axial channels connecting a transverse face and the groove of the ring, said fixing means comprising a plurality of conical studs, each stud being adapted to be inserted in a passage formed by the alignment of an axial channel of the ring with an axial channel of the cylinder collar;
- the outer surface of the ring is composed, at least partly in the axial direction, of a layer of a ceramic material;
- the ring is composed of a first element and a second element, each element being semi-circular;
- a yoke is mounted clamped on the shaft and fixed to a transverse face of the cylinder by fixing means preferably consisting of a plurality of stepped studs;
- the fixing means also comprise a plurality of radial bolts, each bolt being inserted in a radially oriented opening arranged on an edge of the ring, and being screwed into a radially oriented threaded bore arranged in the cylinder;
- the machining tolerance of the outer surface of the ring is 5 hundredths of a millimeter, preferably 4 hundredths of a millimeter, preferably 3 hundredths of a millimeter.

The object of the invention is also an assembly consisting of a shaft and a hoop, characterized in that the hoop corresponds to the abovementioned hoop, the hoop being fixed to the shaft by a cushioning layer made of a cushioning material adapted to and situated in a gap between the shaft and the cylinder.

According to advantageous but non-obligatory aspects of the invention, the assembly as described above may incorporate one or more of the following characteristics, taken in all technically possible combinations:

the cushioning material is a non-shrinking fluid resin, preferably an epoxy resin.

The object of the invention is also a method for mounting a hoop corresponding to the abovementioned hoop on a shaft of a turning machine to form an inner surface of a hydrostatic or hydrodynamic bearing, characterized in that it comprises the steps consisting of:

mounting the cylinder of the hoop around the shaft by assembling the various constituent parts of the cylinder;

fixing the cylinder to the shaft by producing a cushioning layer between the cylinder and the shaft;

mounting the ring on the cylinder by fixing the various constituent elements of the ring on the cylinder.

According to advantageous but non-obligatory aspects of the invention, the method may incorporate one or more of the following characteristics, taken in all technically possible combinations:

the step of mounting the cylinder is followed by a step of adjustment, consisting of balancing the assembly formed by the shaft and the cylinder;

the step of fixing consists of injecting a non-shrinking fluid resin into a gap between the cylinder and the shaft, and waiting for the resin to dry.

BRIEF DESCRIPTION OF THE DRAWINGS

The invention will be better understood and further advantages will appear more clearly in the light of the description below of a particular embodiment of a hoop, an assembly and a method according to the invention, which is given purely as illustration and with reference to the attached drawings in which.

DESCRIPTION

Figure 1:
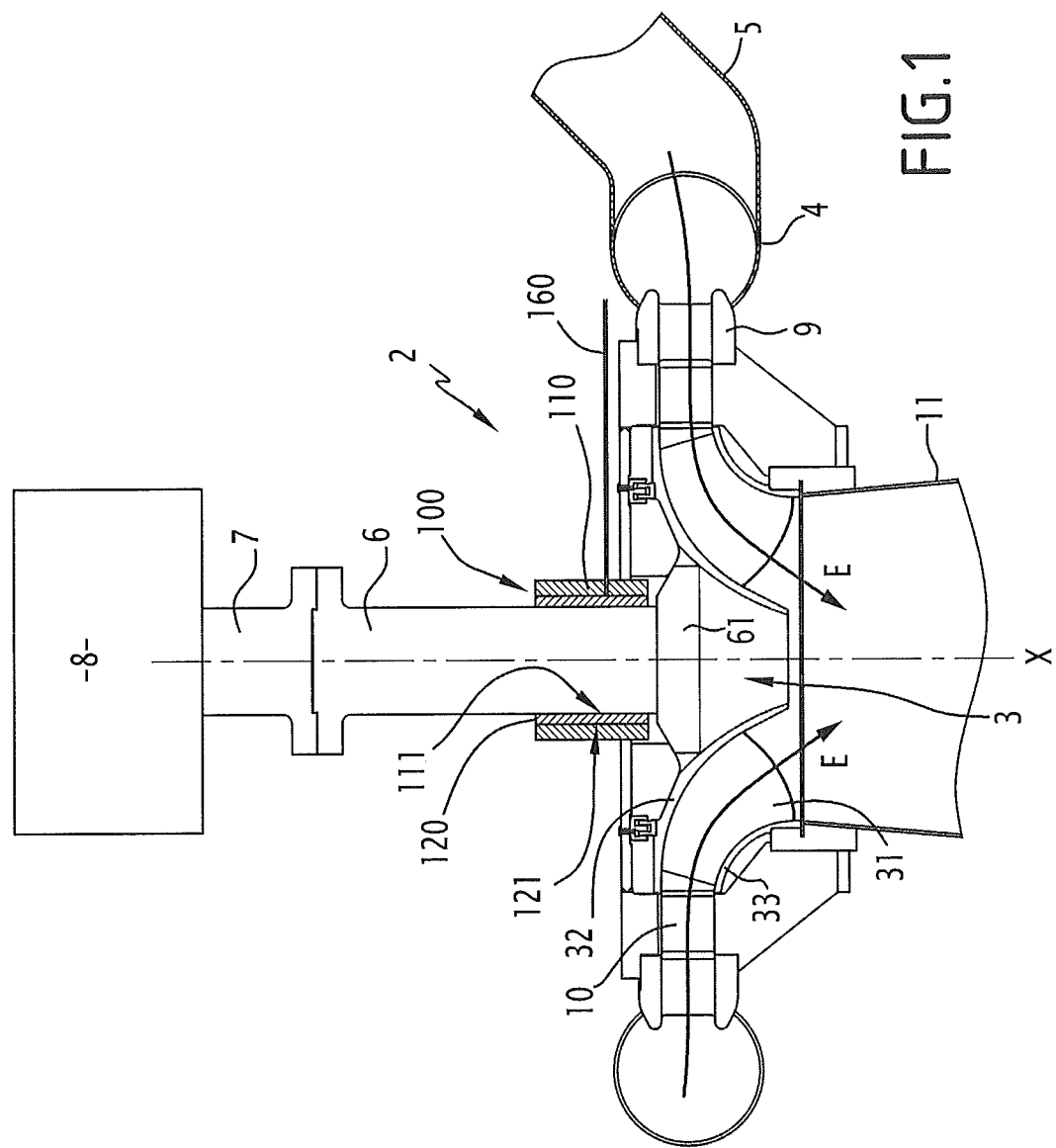
FIG. 1 is an overview of the turning machine integrating the hoop according to the invention mounted on a shaft.

The installation shown in FIG. 1 comprises a Francis water turbine 2, the impeller 3 of which is supplied from a housing 4 into which a forced conduit 5 opens.

The turbine 2 also comprises a shaft 6 on which the impeller 3 is mounted and which rotates with this about an axis $X_6$ which in the present embodiment is vertical, this axis also being a longitudinal axis of the shaft 6. The shaft 6 is rotationally fixed to another shaft 7 forming a drive element of an alternator 8.

A series of pre-guide vanes 9 and guide vanes 10 is provided between the housing 4 and the impeller 3, the function of which is to guide a flow E from the conduit 5 and the housing 4, which flow is intended to pass through the impeller 3 in the direction of the suction pipe 11.

The impeller 3 comprises vanes 31 which extend between a ceiling 32 and a belt 33.

The impeller 3 is fixed to the lower end 61 of the shaft 6, sometimes called the shaft foot. The shaft foot 61 may be integral with the remainder of the shaft 6 or attached thereto. The impeller 3 is mounted on the shaft foot 61 by means known in themselves, such as bolts (not shown).

A hydrostatic bearing 100 is formed around the shaft 6 above the shaft foot 61, in order to absorb the forces exerted on the shaft 6 during rotation of the mobile parts 3 and 6 of the turbine 2 about axis $X_6$.

As a variant, the bearing 100 may be a hydrodynamic bearing.

This bearing 100 is defined between a fixed lining 110 and a hoop 120 integral with the shaft 6. The lining 110 is fixed in that it does not rotate about axis $X_6$ when the impeller 3 and the shaft 6 are turning. The lining 110 is therefore immobile in relation to the structure of the turbine 2, which in particular comprises elements 4 and 5.

The bearing 100 is delimited between the inner radial surface 111 of the lining 110 and the outer radial surface 121 of the hoop 120, these surfaces being both cylindrical, circular and centered on axis $X_6$ when the turbine 2 is in the mounted configuration.

A supply line 160 allows a supply of clear pressurized water to the gap corresponding to bearing 100 between the surfaces 111 and 121 through the lining 110.

In view of the rotation movement between the surface 121 and the surface 111, it is important that surface 121 is as continuous as possible and free from roughness and irregularities.

Figure 2:
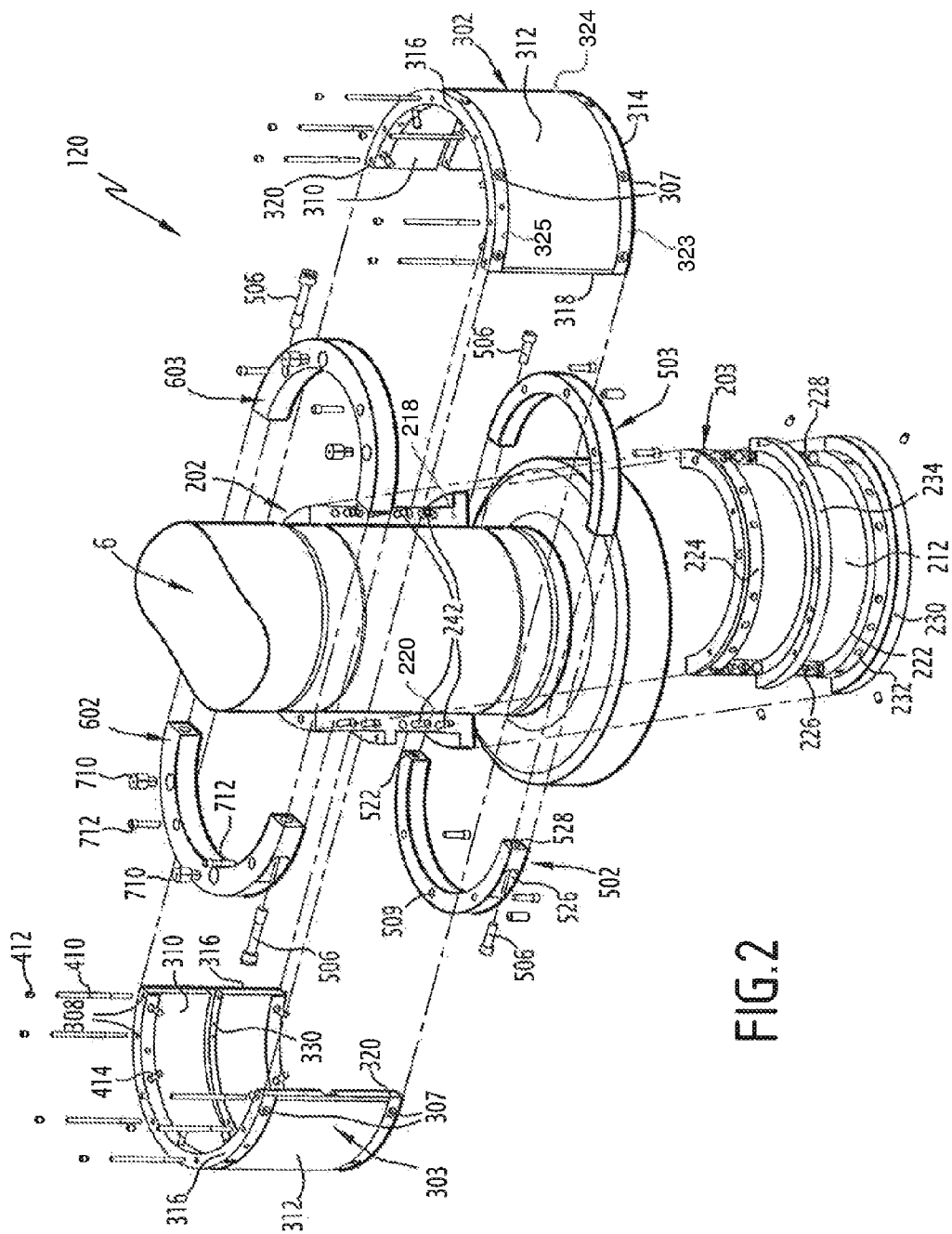
FIG. 2 is an exploded view of the hoop according to the invention.
Figure 3:
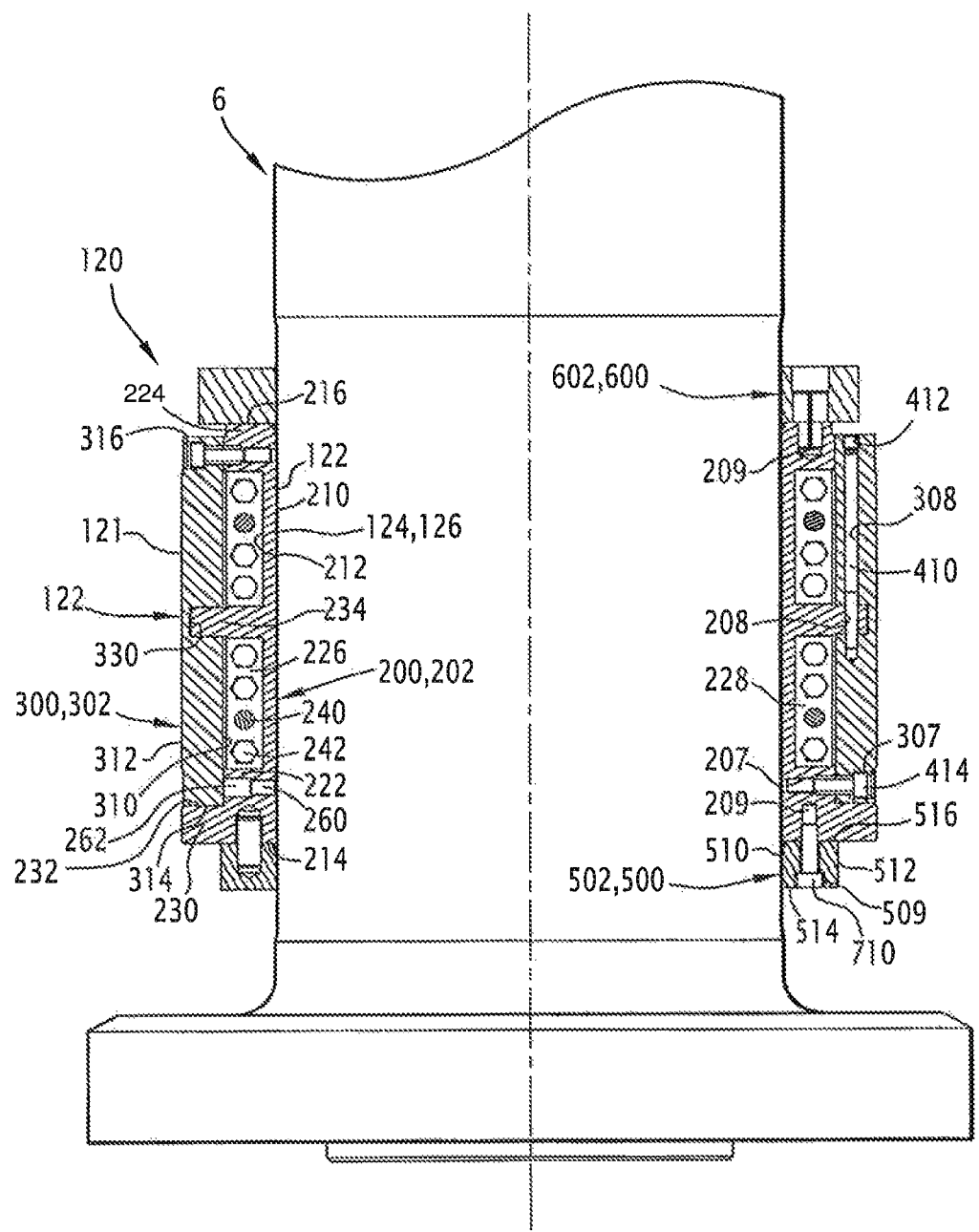
FIG. 3 is a section in an axial plane of the assembly formed by the hoop and the shaft.
Figure 4:
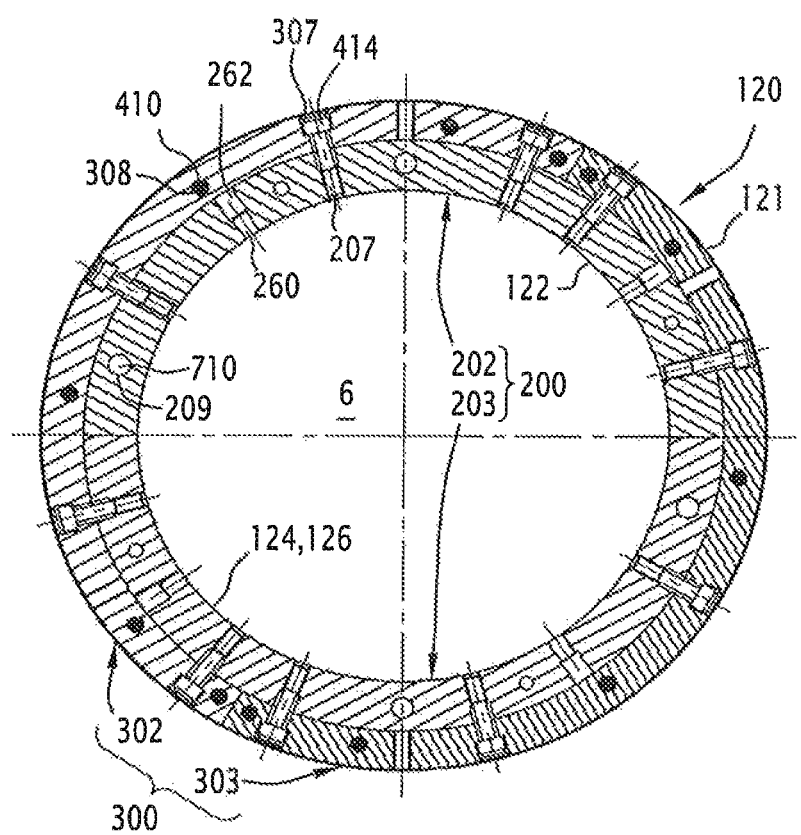
FIG. 4 is a cross-section of the assembly formed by the hoop and the shaft.
Figure 5:
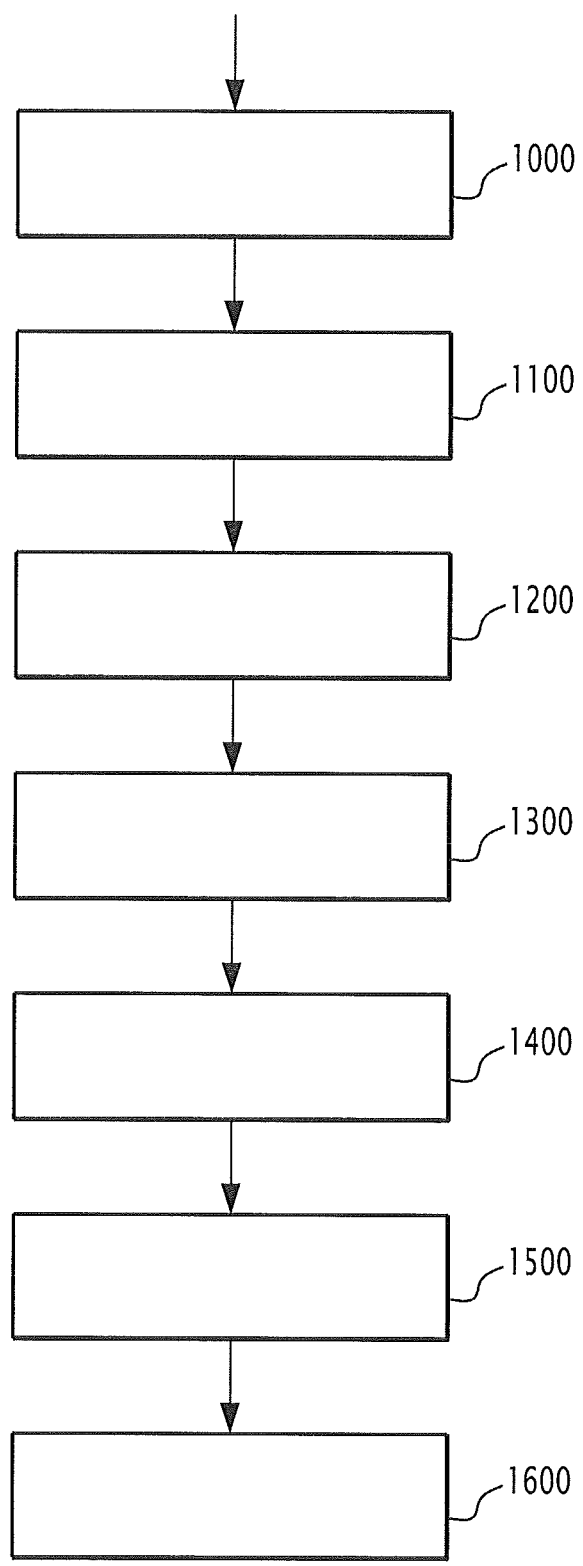
FIG. 5 is a depiction in the form of a block diagram of the method of mounting the hoop on the shaft.

The structure of the hoop 120 is shown in FIGS. 2 to 4.

The hoop 120 is composite. It comprises a cylinder 200 situated radially on the inside of the hoop 120 and surrounding the shaft 6, a ring 300 situated radially on the outside of the hoop 120 and surrounding the cylinder 200, fixing means for the ring 300 on the cylinder 200, lower and upper yokes 500 and 600 on either side of the cylinder 200, and means of fixing the yokes 500 and 600 to the cylinder 200.

In order to be able to be mounted around the shaft 6, the cylinder 200 is composed of a first part 202 and a second part 203. The parts 202 and 203 are identical and joined together by assembly means.

Parts 202 and 203 are semi-circular. Each has a radial inner surface 210, an outer surface 212, flat lower and upper transverse faces 214 and 216 which join the surfaces 210 and 212 on a plane transverse to axis X6, and first and second flat sections 218 and 220 which join the surfaces 210 and 212 on an axial plane containing axis X6.

The contour of the outer surface 212 has lips protruding radially towards the outside: annular lower and upper lips 222 and 224, and first and second rectilinear lips 226 and 228 (FIG. 3).

The lower annular lip 222 carries an annular flange 230 protruding radially towards the outside so as to form with the lip 222 a shoulder 232 for the ring 300.

The first section 218 and the second section 220 are formed on the first rectilinear lip 226 and the second rectilinear lip 228 respectively, while the lower transverse face 214 and upper transverse face 216 are formed on the flange 230 and the upper lip 222 respectively.

At mid-height, the outer surface 212 has a collar 234 protruding radially towards the outside. This extends radially beyond the lips 222 to 224 without extending beyond the flange 230.

In the assembled position of the two parts 202 and 203, the first section 218 of the first part 202 rests on the second section 220 of the second part 203, while the second section 220 of the first part 202 rests on the first section 218 of the second part 203.

Each rectilinear lip 226 and 228 comprises a plurality of through drillings 240 opening orthogonally onto its section. Each drilling of the first section of a part is aligned with a corresponding drilling of the second section of the other part.

The first and second parts 202 and 203 are joined together by bolts 242. Each bolt is inserted in a drilling of one part and the corresponding drilling of the other part, then screwed down to apply the mutually facing rectilinear lips in pairs against each other.

Such assembly means allow the joining of the two parts 202 and 203 without deforming their geometry.

Once the two parts 202 and 203 have been joined, the meeting of the lower surfaces 210 constitutes the inner surface 122 of the hoop 120. Surfaces 210 each have a radius slightly larger than the radius of the shaft 6, at least in the portion of the shaft 6 around which the hoop 120 is mounted. More precisely, the radius of surfaces 210 is equal to the radius of shaft 6 plus a predefined play, preferably equal to 1 millimeter. This play is greater than the tolerance of 50 hundredths of a millimeter on the radius of the outer surface of the shaft 6, so as to guarantee the presence of a gap 124 between the inner surface 122 of the hoop 120 and the shaft 6.

This gap 124 is filled with a cushioning layer 126 allowing fixing of the cylinder 200 to the shaft 6. The layer 126 is made from a cushioning resin, preferably an epoxy resin, linking the cylinder to the shaft so as to absorb the radial forces, the tangential forces being absorbed by the yokes 500 and 600.

The cylinder 200 is fitted with adjustment means consisting of a plurality of button-head screws 260 held in radial threaded through holes 262 provided in the lower and upper lips 222 to 225 of parts 202 and 203. When a button-head screw is screwed in, the distal end of the screw comes into contact with the shaft 6 such that by reaction, the position of the axis of cylinder 200 is modified in relation to that of axis $X_6$ of the shaft 6. On mounting of the cylinder 200 on the shaft 6, the adjustment of the various button-head screws 260 allows balancing of the assembly formed by the shaft 6 and cylinder 200 to avoid any imbalance phenomena around axis $X_6$ while maintaining the gap 124 between the shaft 6 and the cylinder 200.

To fix the ring 300 to the cylinder 200, the upper and lower lips 222 to and 224 of parts 202 and 203 are fitted with radial threaded blind bores 207 intended to cooperate with radial fixing screws of the ring 300 on the cylinder 200, as will be described below.

Furthermore collars 234 and 235 of parts 202 and 203 comprise a plurality of axial through channels 208 distributed in a regular annular pattern. They are intended to receive the conical fixing studs of the ring 300 on the cylinder 200, as will be described below.

Finally the upper and lower faces 214 and 216 of parts 202 and 203 are fitted with axial blind bores 209 to receive the stepped studs fixing the upper yoke 600 and lower yoke 500 to the cylinder 200 as will be described below.

In order to be able to be easily mounted on the outer surfaces 212 of cylinder 200, the ring 300 is composed of a first element 302 and a second element 303 fixed to cylinder 200 by fixing means.

Elements 302 and 303 are semi-circular. Each comprise an inner face 310, an outer radial face 312, flat lower and upper transverse faces 314 and 316 which join surfaces 310 and 312 on a transverse plane, and first and second flat sections 318 and 320 which join surfaces 310 and 312 on an axial plane.

Preferably, the outer surfaces 312 of element 302 and 303 comprises lower and upper edges 323 and 325, and a median portion 324. This consists of a layer of a ceramic material forming an over-thickness and which has been machined when ring 300 is mounted on the cylinder 300, such that in the median portion, the radius of the outer surfaces 312 have the required tolerance to constitute the inner surface of a water bearing.

Once the two elements 302 and 303 have been fixed to the cylinder 200 to form the ring 300, the meeting of the outer surfaces 312 constitutes the outer radial surface 121 of the hoop 120. The dimensions of elements 302 and 303 are adapted such that the outer surfaces 312 are tangential to each other at the junction between the first and second elements 302 and 303, and form a substantially continuous surface.

At mid-height, the inner surfaces 310 of elements 302 or 303 respectively comprise an annular groove 330, the axial dimensions of which are adapted to receive the collar 234 in an adjusted manner.

Element 302 or 303 respectively comprises a plurality of axial channels 308 extending from the upper face 316 to the lower part of element 302, 303, passing through the groove 330. In the position in which the ring 300 is fixed to the cylinder 200, each channel 308 of the ring is precisely aligned with a corresponding channel 208 of the collars 234 of the cylinder (FIG. 3).

Furthermore the upper and lower edges of the outer surfaces 312 respectively of elements 302, 303 have radial through openings 307 comprising an inner shoulder able to receive a headed fixing bolt of element 302, 303 on the cylinder. When the ring is fixed to the cylinder, each opening 307 is precisely aligned with a threaded bore 207 (FIG. 4).

For fixing the ring to the cylinder, the fixing means comprise axial fixing means and radial fixing means.

The axial fixing means consist of conical tapered studs 410 inserted through passages which are formed by a channel 308 on the ring 300 and a corresponding channel 208 in the cylinder 200. These conical studs 410 have a geometry able to ensure fixing without play but without stress on the ring 300 to the cylinder 200. They are held in position by locking screws 412 screwed into the upper portion of the channel 308 situated next to the upper face 316, 317 of the ring.

The radial fixing means consist of radial hexagonal head bolts 414 inserted through openings 307 of the ring 300 and screwed into threaded bores 207 of cylinder 200. The head of the bolt comes to rest on the shoulder of the opening so as to hold the ring 300 radially against the cylinder 200.

Thus using these fixing means, the radius of the outer surface 121 of the hoop 120 retains after mounting the tolerance it had on machining.

The lower collar 500, in order to be able to be mounted easily around the shaft 6, is composed of a first segment 502 and a second segment 503 assembled around the shaft 6.

Segment 502 is semi-circular and has an inner radial surface 510, and outer radial surface 512, flat lower and upper transverse faces 514 and 516 which join surfaces 510 and 512 on a transverse plane, and flat first and second flat sections 518 and 520 which join surfaces 510 and 512 on an axial plane.

Similarly, segment 503 is semi-circular and comprises a radial inner surface 511, a radial outer surface 513, flat lower and upper transverse faces 515 and 517, and flat first and second sections 519 and 521.

The inner surfaces 510 and 511 have a radius equal to or slightly less than the radius of the shaft 6, or at least in the portion around which the hoop 120 is mounted.

Each segment 502 or 503 has a threaded bore 522 which opens orthogonally onto the second section 520, 521.

Also the outer surface 512 and 513 respectively of each segment 502, 503 has a housing 526, through the base of which passes an opening 528 which opens orthogonally onto the first section 518, 519 of segment 502, 503.

A pin 506 is inserted tangentially inside the housing 526 then through the opening 528 in the first section of a segment, so that its rod is screwed into the threaded bore 522 of the second section of the other segment. Suitable screwing allows clamping of the collar on the shaft 6 in order to avoid a relative movement between the hoop and the shaft. This clamping is sufficient to absorb the tangential forces and in particular the seizing torque in the case of damage to the bearing.

The lower collar 500 also comprises a plurality of axial through holes 509 connecting the lower faces 514, 515 and upper faces 516, 517 of the collar 500. Each hole 509 is intended to come into precise alignment with one of the holes 209 on the lower face 214, 215 of the cylinder 200 against which the lower collar 500 is placed.

The fixing means consists of a plurality of stepped studs 710. Each stud 710 is housed in a hole 509 so as to protrude into the corresponding hole 209. The studs 710 are dimensioned to allow the absorption of forces between the cylinder 200 and the collar 500.

A similar description may be given to present the structure of the upper collar 600.

The method for mounting the hoop 120 is as follows.

In a preceding step 1000 of machining the outer surface 121 of the hoop 120 while the ring 300 is mounted on the cylinder 200, the ceramic layer forming the median portion of the outer faces 312 and 313 of elements 302 and 303 constituting the ring is machined. The outer surface 121 obtained has a radius characterized by a tolerance which is less than or equal to the tolerance required for the inner surface of the water bearing.

On site, when replacing an oil bearing by a water bearing, the oil bearing is removed and the hoop 120 described above is mounted directly on the shaft 6.

In a step 1100 of mounting the lower collar 500, the two segments 502 and 503 are brought to the shaft and joined together by the insertion of button-head screws 506. Then the pins are screwed together to clamp the collar 500 to the shaft.

In a step 1200 of mounting the cylinder 200 around the shaft 6, the first and second parts 202 and 203 are brought to either side of the shaft 6. The first section 218, 219 of one part is brought to rest on the second section 220, 221 of the other part such that each drilling 240 of the first section is in alignment with corresponding drillings 240 of a second section. The two parts 202 and 203 are then assembled by placing the bolts 242 in the different pairs of drillings 240, then tightening the bolts 242. This assembly is then lowered vertically to rest on the upper face 516 of the lower collar 500. The cylinder is rotated around axis $X_6$ such that the blind axial holes 209 of cylinder 200 are in alignment with the holes 509 of the lower collar 500. The stepped studs 710 are screwed into holes 509 to protrude vertically beyond the upper transverse face 516 of collar 500 into the blind axial holes 209 of cylinder 200.

In a step 1300 of adjusting the relative position of cylinder 200 in relation to axis $X_6$ of shaft 6, an operator tightens or loosens the button-head screws 260 such that they come to rest on the shaft 6. On each modification of the distance over which a button-head screw 260 protrudes radially in relation to the inner surface 210, 211 of cylinder 200, the assembly formed by the shaft and the cylinder is set in rotation to determine whether the assembly is correctly balanced around rotation axis $X_6$. After this step, a gap 124 is created between the cylinder 200 and the surface of the shaft 6.

In a step 1400 of fixing the cylinder to the shaft 6, a cushioning layer 126 is produced between the inner surfaces 210, 211 of cylinder 200 and the shaft surface. A cushioning resin with a suitable fluidity is injected into the gap 124. The cushioning resin is selected such that it does not shrink during setting. After polymerization of the resin, cylinder 200 is fixed to the shaft 6 at least with regard to absorption of radial stresses, the tangential stresses being absorbed by collars 500 and 600.

In a step 1500 of fixing the ring 300 to the cylinder 200, the first element 302 is arranged on the cylinder such that its lower face 514 sits in the shoulder 232, 234 formed between the lower lip 222, 223 and the yoke 230, 231 of the cylinder, and that collar 234, 235 of the cylinder is received in the groove 330. The first element 302 is moved radially to align each axial channel 308 with a corresponding axial channel 208 in the collar 234, 235 of the cylinder, and each radial opening 307 is aligned with a corresponding threaded bore 207 on the lower and upper lips of the cylinder. Conical studs 410 are inserted in the passages formed by the axial channels in the ring and cylinder, and are locked in position by tightening the locking screws 412. Radial bolts 414 are screwed through openings 307 into bores 207. The ring is thus fixed to the shaft 6 via the cylinder 300.

In a step 1600 of mounting the upper yoke 600, the two segments 602 and 603 are brought to the shaft and joined together by insertion of pins 506. Before definitive tightening of the yoke 600 on the shaft 6, the yoke 600 is applied against the upper transverse face 216 of cylinder 200 and oriented radially such that the axial through holes 609 align with the axial blind holes 209 of cylinder 200. Once this relative position is obtained, the stepped studs 710 are inserted in holes 609 and 209. Studs 710 are held in position by the fitting of locking screws 712. Thus the lower yoke 600 is attached to cylinder 200.

After mounting the hoop 120 on the shaft 6, the lining 110 is fitted and other reassembly steps carried out allowing the machine to be recommissioned.

The hoop according to the invention and its mounting method guarantee that the inner surface of the bearing has the required tolerance.

The production of a cushioning layer means there is no need to machine the shaft surface to give it a tolerance compatible with a tolerance required on a surface constituting the inner surface of a water bearing.

The cylinder is fixed to the shaft without clamping and consequently without deforming its geometry, at least the geometry of its outer surfaces on which the constituent elements of the ring are positioned and fixed.

Furthermore, because the hoop consists of a cylinder and a ring, the ring can to be fixed to the shaft using axial and optionally radial fixing means. Thus the geometry of the outer surface of the ring is not deformed once fixed to the cylinder, which allows the tolerance achieved during machining to be retained.

The invention claimed is:

1. A hoop intended to be mounted on a shaft of a turning machine to form an inner surface of a hydrostatic or hydrodynamic bearing, the hoop comprising:
   a cylinder which, in order to be able to be mounted around the shaft, is composed of multiple parts that are joined together to produce an assembly without deformation of an outer surface of the cylinder, the cylinder defining an outer wall;
   the cylinder further comprising a plurality of radial threaded through holes and screws engaged in the through holes, wherein upon mounting the cylinder to the shaft, the screws contact the shaft and position an axis of the cylinder relative to an axis of the shaft;
   the cylinder further comprising a plurality of radial threaded blind bores;
   a ring, an outer surface of which constitutes an inner surface of the bearing, the ring comprising a plurality of elements fixed to the cylinder so as to retain a machining tolerance of the outer surface of the ring; and
   the ring further comprising a plurality of radial through holes that align with the radial threaded blind bores in the cylinder, wherein for assembly of the hoop on the shaft, the ring is screwed onto the cylinder with screws extending through the through holes and threaded into the threaded blind bores.

2. The hoop as claimed in claim 1, wherein the radial threaded through holes and screws allow balancing of the assembly formed by the shaft and cylinder while maintaining a gap between the shaft and the cylinder.

3. The hoop as claimed in claim 1, wherein the cylinder is composed of a first part and a second part, each of the first part and the second part being semi-circular.

4. The hoop as claimed in claim 1, wherein the cylinder comprises an annular collar extending radially towards the outside, and the ring comprises an annular groove adapted to receive the collar during fixing of the ring to the cylinder.

5. The hoop as claimed in claim 4, wherein the collar comprises a plurality of axial through channels and the ring comprises a plurality of axial channels, and further comprising a plurality of conical studs, each stud being adapted to be inserted in a passage formed by alignment of an axial channel of the ring with an axial channel of the collar of the cylinder to fix the annular collar in the ring groove.

6. The hoop as claimed in claim 1, wherein the outer surface of the ring is composed, at least partly in the axial direction, of a layer of a ceramic material.

7. The hoop as claimed in claim 1, wherein the ring is composed of a first element and a second element, each element being semi-circular.

8. The hoop as claimed claim 1, comprising a yoke clamped on the shaft and fixed to a transverse face of the cylinder by a plurality of stepped studs.

9. The hoop as claimed in claim 1, wherein the machining tolerance of the outer surface of the ring is 5 hundredths of a millimeter or less.

10. An assembly comprising a shaft and a hoop, wherein said hoop is in accordance with claim 1, said hoop being fixed to the shaft by a cushioning layer made of a cushioning material adapted to and situated in a gap between the shaft and the cylinder.

11. The assembly as claimed in claim 10, wherein said cushioning material is a non-shrinking fluid resin.

12. A method for mounting a hoop on a shaft of a turning machine to form an inner surface of a hydrostatic or hydrodynamic bearing; the method comprising:
    mounting multiple parts of a cylinder of the hoop around the shaft to provide a complete assembled cylinder around the shaft;
    aligning the cylinder to the shaft by providing a cushioning layer between the cylinder and the shaft and by screwing screws into a plurality of radial threaded through holes defined in the cylinder so that the screws contact the shaft;
    positioning an axis of the cylinder relative to an axis of the shaft by adjusting the screws that extend through the cylinder and contact the shaft;
    mounting a plurality of ring components on the cylinder to define a complete ring assembly fixed on the cylinder with screws that extend through the ring into threaded blind bores in the cylinder.

13. The method as claimed in claim 12, wherein the step of mounting the cylinder is followed by a step of adjustment, consisting of balancing the assembly formed by the shaft and the cylinder.

14. The method as claimed in claim 12, wherein the step of providing a cushioning layer between the cylinder and the shaft comprises injecting a non-shrinking fluid resin into a gap between the cylinder and the shaft, and waiting for the resin to dry.

* * * * *